United States Patent
Kannan et al.

(10) Patent No.: US 9,036,665 B2
(45) Date of Patent: May 19, 2015

(54) SYSTEM AND METHOD FOR REAL-TIME DETECTION, IDENTIFICATION AND REPORTING OF MAC-SYNC FAILURES IN DISTRIBUTED TRUNKING

(71) Applicant: HEWLETT-PACKARD DEVELOPMENT COMPANY, L.P., Houston, TX (US)

(72) Inventors: Madhu Prashanth Kannan, Bangalore (IN); Kalaiponni Muniswamy, Bangalore-Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 13/747,758

(22) Filed: Jan. 23, 2013

(65) Prior Publication Data

US 2014/0036935 A1 Feb. 6, 2014

(30) Foreign Application Priority Data

Jul. 31, 2012 (IN) .............................. 3142/CHE/2012

(51) Int. Cl.
*H04J 3/06* (2006.01)
*H04L 12/24* (2006.01)
*H04L 12/26* (2006.01)
*H04L 12/931* (2013.01)

(52) U.S. Cl.
CPC .............. *H04L 41/06* (2013.01); *H04L 43/065* (2013.01); *H04L 49/70* (2013.01); *H04L 41/0631* (2013.01)

(58) Field of Classification Search
CPC . H04L 12/4641; H04L 41/06; H04L 41/0631; H04L 43/065; H04L 49/555; H04L 49/70
USPC .............. 370/244, 328, 390, 391, 401, 503; 709/220, 227
See application file for complete search history.

(56) References Cited

U.S. PATENT DOCUMENTS

| | | | |
|---|---|---|---|
| 5,959,969 A * | 9/1999 | Croslin et al. ................ | 370/216 |
| 7,345,991 B1 | 3/2008 | Shabtay et al. | |
| 7,463,579 B2 | 12/2008 | Lapuh et al. | |
| 2003/0140124 A1 * | 7/2003 | Burns ........................... | 709/220 |
| 2010/0110903 A1 * | 5/2010 | Spott et al. .................... | 370/244 |
| 2011/0299402 A1 * | 12/2011 | Vobbilisetty et al. ......... | 370/241 |
| 2012/0063465 A1 * | 3/2012 | Keesara et al. ............... | 370/401 |
| 2013/0286942 A1 * | 10/2013 | Bonar et al. .................. | 370/328 |

OTHER PUBLICATIONS

"Configuration—VLANs, Spanning Tree, and MultiLink Trunking," Nortel Ethernet Switch 460/470, Mar. 12, 2007.
"Mac Address Group Through Revision," Cisco IOS LAN Switching Command Reference, Nov. 2010, <http://www.cisco.com/en/US/docs/ios/lanswitch/command/reference/lsw_m1.pdf>.
Daniel, A., "HP ProCurve Cross-Stack EtherChannel" vNephon.com, Sep. 15, 2009.

* cited by examiner

*Primary Examiner* — Afsar M Qureshi
(74) *Attorney, Agent, or Firm* — HP Patent Department

(57) ABSTRACT

A system and method for real-time detection, identification, and reporting of mac-sync failures in distributed trunking (DT) are disclosed. In one example, a mac-sync failure between a pair of communicatively coupled DT switches is detected in real-time. Further, a type of mac-sync failure between the pair of DT switches is dynamically identified upon detecting the mac-sync failure. Furthermore, an information technology (IT) admin is dynamically notified about the type of mac-sync failure between the pair of DT switches.

20 Claims, 2 Drawing Sheets

SYSTEM AND METHOD FOR REAL-TIME DETECTION, IDENTIFICATION AND REPORTING OF MAC-SYNC FAILURES IN DISTRIBUTED TRUNKING

BACKGROUND

Distributed trunking (DT) between switches is a kind of link aggregation computer networking technology that allows multiple Ethernet trunks to be aggregated together in order to provide a single logical trunk. Many such link aggregation computer networking technologies support mac-sync enabled switches via an inter switch connect (ISC). In some instances, mac-sync of mac-addresses between DT pair of switches fails due to an ISC link failure or interoperability between spanning tree protocol (STP) and DT. This may result in connectivity loss from downstream to upstream and vice versa. Further, this can become even more of a problem when the DT pair of switches are not present in the same rack and are disposed in two different locations connected via a network. Such situations can result in connectivity issues due to mac-sync failures.

Existing solutions use show commands and debug commands that are centered around configuration mismatch between the DT pair of switches. Further, the existing solutions use low level logging or binary representation with active monitoring of mac table and interface statuses. However, these solutions do not address or provide a quick and easy identification of mac-sync failures when connectivity issues, such as ISC link being down or a flap problem, arise in the DT computer networking environment. Furthermore, the existing solutions use STP traps for spanning tree loop detection in mac move type of mac-sync failure. However, these solutions do not provide the cause or transition state of the mac move in the DT computer networking environment.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for real-time detection, identification, and reporting of mac-sync failures in distributed trunking (DT). In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

The terms "DT switches" and "upstream DT switches" are used interchangeably throughout the document.

Figure 1:
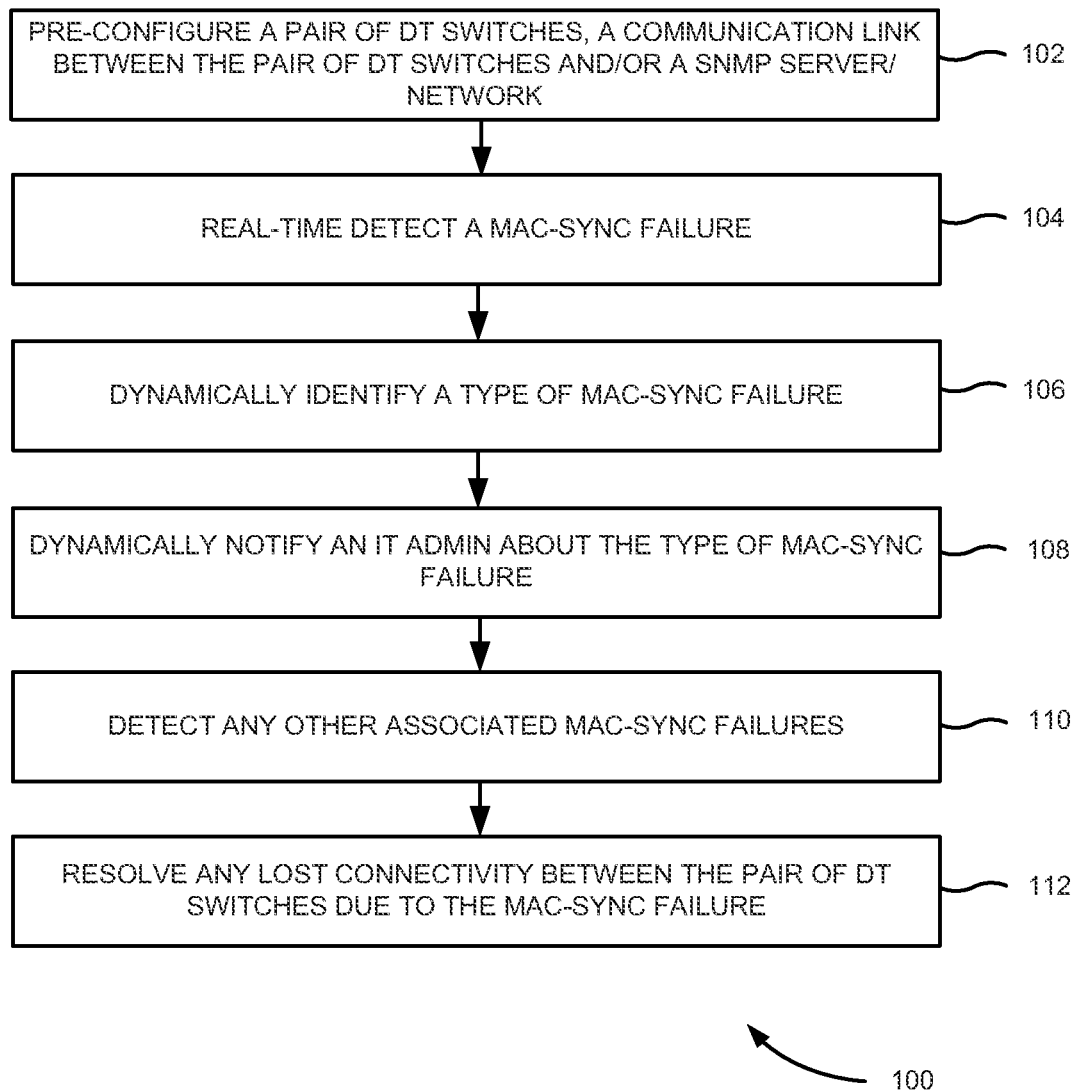
FIG. 1 illustrates a flow diagram of an exemplary method for real-time detection, identification and reporting of mac-sync failures in distributed trunking (DT)

FIG. 1 illustrates a flow diagram 100 of an exemplary method for real-time detection, identification and reporting of mac-sync failures in DT. At block 102, a pair of DT switches, a communication link between the pair of DT switches and/or a simple network management protocol (SNMP) server/network are pre-configured to detect, identify, and notify the mac-sync failures. Exemplary communication link between the pair of DT switches includes an inter switch connect (ISO) link. For example, the ISO link includes an optical link or a copper link.

At block 104, a mac-sync failure between the pair of communicatively coupled DT switches is detected in real-time. Exemplary mac-sync failure includes a down ISO link, a flapping ISO link, a mac move and/or a network loop. At block 106, a type of mac-sync failure between the pair of DT switches is dynamically identified upon detecting the mac-sync failure. Upon detecting the mac-sync failure, the condition and/or state of mac-sync failure between the pair of DT switches is dynamically identified using a look-up table residing in associated one of the pair of DT switches. This is explained in more detail with reference to FIG. 2.

At block 108, an information technology (IT) admin is dynamically notified about the type of mac-sync failure between the pair of DT switches. For example, information associated with the identified type of mac-sync failure is sent via an SNMP trap to the pre-configured SNMP server/network. Further, the IT admin is dynamically notified about the type of mac-sync failure between the pair of DT switches by the pre-configured SNMP server/network. This is explained in more detail with reference to FIG. 2.

At block 110, any other associated mac-sync failures are detected upon receiving the notification by the IT admin. At block 112, any lost connectivity between the pair of DT switches due to the mac-sync failure is resolved by the IT admin upon receiving the notification of the mac-sync failure and any other detected associated mac-sync failures.

Figure 2:
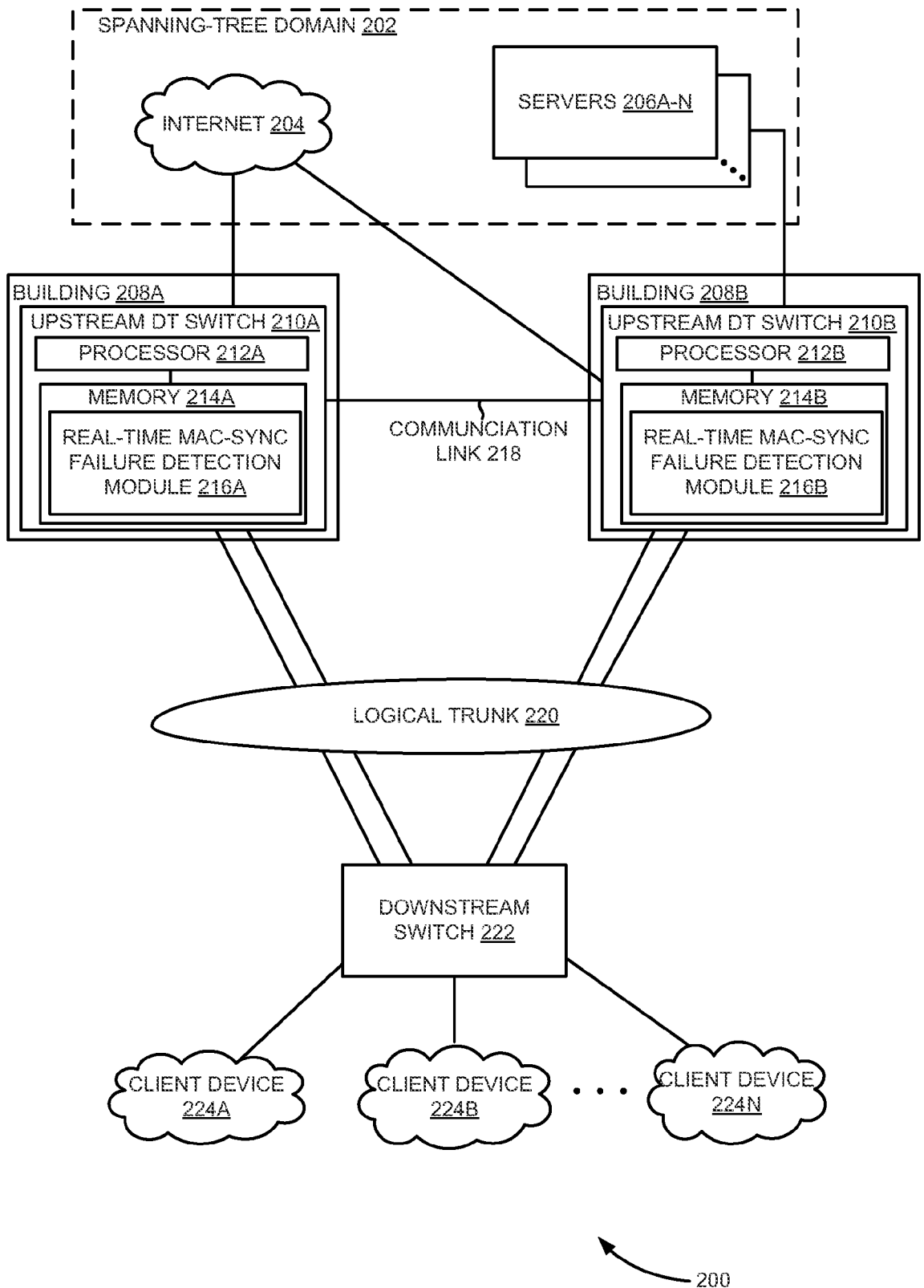
FIG. 2 illustrates an exemplary block diagram of a DT system including major components for the real-time detection, identification and reporting of mac-sync failures in the DT, using the process described with reference to FIG. 1.

Referring now to FIG. 2, which illustrates an exemplary block diagram of a DT system 200 including major components for the real-time detection, identification and reporting of mac-sync failures in the DT, using the process described with reference to FIG. 1. As shown in FIG. 2, the DT system 200 includes a spanning tree domain 202, buildings 208A and 208B, a downstream switch 222 and one or more client devices 224A-N. Further, the spanning tree domain 202 includes Internet 204 and servers 206A-N. Furthermore, upstream DT switches 210A and 210B reside in the buildings 208A and 208B, respectively. In addition, each of the upstream DT switches 210A and 210B includes a processor 212A and memory 214A and a processor 212B and memory 214B, respectively. Also, the memory 214A and 214B includes real-time mac-sync failure detection modules 216A and 216B, respectively. For example, the real-time mac-sync failure detection modules 216A and 216B can be in the form of instructions stored on a non-transitory computer-readable storage medium. The non-transitory computer-readable storage medium having the instructions that, when executed by a computing device, causes the computing device to perform the method described in FIG. 1.

Further as shown in FIG. 2, the upstream DT switches 210A and 210B are coupled to each other via a communication link 218. Exemplary communication link between the upstream DT switches 210A and 210B includes an inter switch connect (ISO) link. The ISO link includes an optical link or a copper link. Furthermore, the upstream DT switches 210A and 210B are communicatively coupled to the servers 206A-N via the Internet 204. In addition, the downstream switch 222 is coupled to the upstream DT switches 210A and 210B via a logical trunk 220. Also, each of the processors 212A and 212B is coupled to associated memory 214A and 214B. Moreover, the client devices 224A-N are communicatively coupled to the downstream switch 222.

In one exemplary implementation, the upstream DT switches 210A and 210B, the communication link 218 between the upstream DT switches 210A and 210B and/or a simple network management protocol (SNMP) server/network are pre-configured to detect, identify, and notify the mac-sync failures in the DT system 200. The DT switches 210A and 210B and the communication link 218 are pre-configured to allow aggregation of trunks as one logical trunk 220 to the downstream switch 222. Further, the mac-addresses learnt on either the upstream DT switch 210A or 210B are synced with each other. The client devices 224A-N then connect to the Internet 204 and/or the servers 206A-N via any the upstream DT switch 210A or 210B.

In operation, the real-time mac-sync failure detection modules 216A and 216B detect a mac-sync failure between the DT switches 210A and 210B in real time. The mac-sync failure includes a down ISO link, a flapping ISO link, a mac move and/or a network loop. Upon detecting the mac-sync failure, the real-time mac-sync failure detection modules 216A and 216B dynamically identify a type of mac-sync failure between the DT switches 210A and 210B. For example, condition and/or state of mac-sync failure is dynamically identified using a look-up table residing in associated one of the DT switches 210A and 210B. In one exemplary implementation, a display command "show dt-isc-mac-sync" is used to obtain the condition/state of mac-sync failure between the DT switches 210A and 210B.

Further in operation, the real-time mac-sync failure detection modules 216A and 216B dynamically notify an IT admin about the type of mac-sync failure between the DT switches 210A and 210B. For example, the real-time mac-sync failure detection modules 216A and 216B send information associated with the identified type of mac-sync failure via an SNMP trap to the pre-configured SNMP server/network. Further, the pre-configured SNMP server/network dynamically notifies the IT admin about the type of mac-sync failure between the DT switches 210A and 210B.

In one exemplary implementation, ISC link down for more than 3 seconds is represented as ISC D.., ISC link flapped within 3 seconds is represented as ISC .F., blocked due to spanning tree protocol (STP) is represented as ISC..B, ISC link Hello Message received as expected every second is represented as ISC ...U, mac move from logical trunk 220 to communication link 218 within 1 second is represented as I..., mac move from communication link 218 to logical trunk 220 is represented as .T.., client device mac move in spanning tree domain 202 is represented as ..S. and client device mac move in DT domain is represented as ...D.

Furthermore in operation, the real-time mac-sync failure detection modules 216A and 216B detect any other associated mac-sync failures upon receiving the notification by the IT admin. The real-time mac-sync failure detection modules 216A and 216B also detect primary and secondary DT mac-addresses and respective up times. In addition, the IT admin resolves any lost connectivity between the DT switches 210A and 210B upon receiving the notification of the mac-sync failure and any other detected associated mac-sync failures.

In an exemplary scenario, the real-time mac-sync failure detection module 216A or 216B detects a mac-sync failure and dynamically identifies the mac-sync failure is caused due to an ISC link down. The information associated with the identified type of mac-sync failure is represented as ISC D.... Further, the real-time mac-sync failure detection module 216A or 216B is polled every 5 seconds, using a timer, to check the status of the ISC link. This enables the IT admin to determine the latest condition or status of the ISC link. Furthermore, the real-time mac-sync failure detection module 216A or 216B sends information associated with the identified type of mac-sync failure via an SNMP trap to the pre-configured SNMP server/network. Also, the pre-configured SNMP server/network dynamically notifies the IT admin about the type of mac-sync failure between the DT switches 210A and 210B. The IT admin then receives the information in a network management tool and accesses the associated DT switch for rectifying the mac-sync failure.

In various examples, system and method described in FIGS. 1-2 propose a technique for real-time detection, identification, and reporting of mac-sync failures in a DT system. The technique allows a one stop verification of mac-sync correctness and quick representation of mac-sync failures. The technique also optimizes mac-sync failure detection. Furthermore, the technique is extendable to other mac-sync protocols.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
    detecting a mac-sync failure between a pair of communicatively coupled distributed trunking (DT) switches that are coupled to each other over a communication link and coupled to a second switch over a logical trunk including an aggregation of trunks;
    in response to detecting the mac-sync failure, dynamically identifying, by at least one of the DT switches, a type of the mac-sync failure between the pair of DT switches, the identified type of the mac-sync failure being a selected one of a plurality of different types of mac-sync failures; and
    dynamically notifying an information technology (IT) entity about the identified type of the mac-sync failure between the pair of DT switches.

2. The method of claim 1, further comprising:
    pre-configuring the pair of DT switches and the communication link between the pair of DT switches to detect, identify, and notify of the mac-sync failures.

3. The method of claim 2, wherein dynamically notifying the IT entity about the identified type of the mac-sync failure between the pair of DT switches comprises:
    sending information associated with the identified type of the mac-sync failure along with a Simple Network Management Protocol (SNMP) trap to an SNMP server.

4. The method of claim 1, wherein the communication link between the pair of DT switches comprises an inter switch connect (ISC) link, and wherein the ISC link comprises an optical link or a copper link.

5. The method of claim 4, wherein the plurality of different types of mac-sync failures comprise at least two from among a down ISC link, a flapping ISC link, a mac move, and a network loop.

6. The method of claim 1, wherein dynamically identifying the type of the mac-sync failure between the pair of DT switches in response to detecting the mac-sync failure comprises:
dynamically identifying a condition and/or state of the mac-sync failure between the pair of DT switches using a look-up table residing in one of the pair of DT switches.

7. The method of claim 1, further comprising:
detecting another associated mac-sync failure in response to receiving the notification by the IT entity.

8. The method of claim 7, further comprising:
resolving any lost connectivity between the pair of DT switches due to the mac-sync failure upon receiving the notification of the identified type of the mac-sync failure and the another associated mac-sync failure by the IT entity.

9. A distributed trunking (DT) system, comprising:
two or more upstream DT switches, wherein the two or more upstream DT switches are coupled to each other via a communication link and are to be further communicatively coupled to one or more servers via Internet;
a downstream switch coupled to the two or more upstream DT switches via a logical trunk, the downstream switch to be communicatively coupled to a client device;
wherein each of the two or more upstream DT switches comprises:
a processor; and
a memory coupled to the processor, wherein the memory comprises a real-time mac-sync failure detection module configured to:
real-time detect a mac-sync failure between a pair of the two or more upstream DT switches;
dynamically identify a type of mac-sync failure between the pair of upstream DT switches upon detecting the mac-sync failure; and
dynamically notify an information technology (IT) admin about the type of mac-sync failure between the pair of upstream DT switches.

10. The DT system of claim 9, wherein the real-time mac-sync failure detection module is further configured to:
pre-configure the pair of upstream DT switches and the communication link between the pair of upstream DT switches to detect, identify, and notify mac-sync failures.

11. The DT system of claim 10, wherein the dynamically notifying of the IT admin about the type of mac-sync failure between the pair of upstream DT switches comprises:
sending information associated with the identified type of mac-sync failure along with a Simple Network Management Protocol (SNMP) trap to an SNMP server by the real-time mac-sync failure detection module.

12. The DT system of claim 9, wherein the dynamically identifying of the type of mac-sync failure between the pair of upstream DT switches upon detecting the mac-sync failure comprises:
dynamically identifying a condition and/or state of the mac-sync failure between the pair of upstream DT switches using a look-up table residing in one of the pair of upstream DT switches by the real-time mac-sync failure detection module.

13. A non-transitory computer-readable storage medium storing instructions that when executed by a system cause the system to:
real-time detect a mac-sync failure between a pair of communicatively coupled distributed trunking (DT) switches that are coupled to each other over a communication link and coupled to a second switch over a logical trunk including an aggregation of trunks;
in response to detecting the mac-sync failure, dynamically identify, by at least one of the DT switches, a type of mac-sync failure between the pair of DT switches, the identified type of the mac-sync failure being a selected one of a plurality of different types of mac-sync failures; and
dynamically notify an information technology (IT) entity about the identified type of the mac-sync failure between the pair of DT switches.

14. The non-transitory computer-readable storage medium of claim 13, wherein the instructions when executed cause the system to further
pre-configure the pair of DT switches and the communication link between the pair of DT switches to detect, identify, and notify of the mac-sync failures.

15. The non-transitory computer-readable storage medium of claim 13, wherein dynamically identifying the type of the mac-sync failure between the pair of DT switches in response to detecting the mac-sync failure comprises:
dynamically identifying a condition and/or state of the mac-sync failure between the pair of DT switches using a look-up table residing in one of the pair of DT switches.

16. The method of claim 1, wherein detecting the mac-sync failure between the pair of DT switches comprises detecting the mac-sync failure between the pair of DT switches that are communicatively coupled to one or more servers via Internet, and wherein the second switch is coupled to a client device.

17. The method of claim 1, wherein the detecting, the dynamically identifying, and the dynamically notifying are performed by instructions executed in at least one of the DT switches.

18. The DT system of claim 9, wherein the identified type of mac-sync failure is a selected one of a plurality of different types of mac-sync failures, the plurality of different types of mac-sync failures selected from among a down inter switch connect (ISC) link between the pair of upstream DT switches, a flapping ISC link, a mac move, and a network loop.

19. The non-transitory computer-readable storage medium of claim 13, wherein the identified type of mac-sync failure is a selected one of a plurality of different types of mac-sync failures, the plurality of different types of mac-sync failures selected from among a down inter switch connect (ISC) link between the pair of upstream DT switches, a flapping ISC link, a mac move, and a network loop.

20. The non-transitory computer-readable storage medium of claim 13, wherein detecting the mac-sync failure between the pair of DT switches comprises detecting the mac-sync failure between the pair of DT switches that are communicatively coupled to one or more servers via Internet, and wherein the second switch is coupled to a client device.

* * * * *

UNITED STATES PATENT AND TRADEMARK OFFICE
CERTIFICATE OF CORRECTION

PATENT NO. : 9,036,665 B2  
APPLICATION NO. : 13/747758  
DATED : May 19, 2015  
INVENTOR(S) : Madhu Prashanth Kannan et al.

It is certified that error appears in the above-identified patent and that said Letters Patent is hereby corrected as shown below:

IN THE DRAWINGS

In sheet 2 of 2, reference numeral 218, line 1, delete "COMMUNCIATION" and insert -- COMMUNICATION --, therefor.

Signed and Sealed this  
Sixth Day of October, 2015

Michelle K. Lee  
*Director of the United States Patent and Trademark Office*